United States Patent [19]
Francisco

[11] Patent Number: 5,321,602
[45] Date of Patent: Jun. 14, 1994

[54] TUTORIAL CONTROL PANEL

[75] Inventor: Robert J. Francisco, New Fairfield, Conn.

[73] Assignee: Pitney Bowes Inc., Stamford, Conn.

[21] Appl. No.: 533,193

[22] Filed: Jun. 4, 1990

[51] Int. Cl.⁵ .............................................. G05B 11/01
[52] U.S. Cl. .................................... 364/146; 364/188; 364/189
[58] Field of Search ........... 364/146, 188, 189, 474.22, 364/709.14, 709.15, 790.16, 478

[56] References Cited

U.S. PATENT DOCUMENTS

| | | | |
|---|---|---|---|
| 4,418,398 | 11/1983 | Hornung | 364/146 X |
| 4,823,311 | 4/1989 | Hunter et al. | 364/709.14 X |
| 4,845,652 | 7/1989 | Bunsen | 364/709.14 |
| 4,970,654 | 11/1990 | Francisco | 364/478 |
| 4,977,310 | 12/1990 | Studer et al. | 364/146 X |
| 4,991,077 | 2/1991 | Kawasaki et al. | 364/474.22 |
| 4,992,950 | 2/1991 | Francisco | 364/478 |
| 5,027,279 | 6/1991 | Gottlieb et al. | 364/478 |

Primary Examiner—Jerry Smith
Assistant Examiner—Jim Trammell
Attorney, Agent, or Firm—Charles R. Malandra, Jr.; Melvin J. Scolnick

[57] ABSTRACT

A method and apparatus for controlling a machine. The method includes providing a control panel having a plurality of control switches and respectively associated illumination means, identifying by illumination which of the control switches are selectable for control at any given moment; and choosing an operation by selecting one of the control switches whose associated illumination means is illuminated. The apparatus includes a controller and software for controlling a machine. Control switches and associated illumination means are operatively connected to the controller. Selectable switches are identified by illumination of the illumination means associated with the selectable switches.

9 Claims, 9 Drawing Sheets

TUTORIAL CONTROL PANEL

FIELD OF THE INVENTION

This invention relates to control panels on machines, and more particularly to control panels on inserting machines having sophisticated control systems.

BACKGROUND OF THE INVENTION

It is known to have control panels for the purpose of controlling machines, for example inserting devices. Generally, the size and complexity of a control panel for a particular machine depends on the number of functions performed by the machine and the level of sophistication of the control software.

For inserting machines, at one end of the spectrum is a so-called "console" inserter system which is a large inserter system usually customized to meet the needs of each customer and which requires sophisticated computer control. An example of this type of inserter system is the 8300 Series Inserter made by Pitney Bowes of Stamford, Conn. These inserters have a touch screen control panel for providing interactive control by an operator. Through the touch screen the control software provides the operator with status information and prompts which facilitate the set up and operation of such large inserters. U.S. Pat. No. 4,547,856 assigned to the assignee of the present invention describes such a sophisticated console inserter system.

At the other end of the spectrum are inserters having only basic mechanical control operated through switches or push buttons on a control panel. Generally, inserters having such a basic control panel are small in comparison to the console inserters described above. An example of these inserters are the 3340 Table Top Series Inserters made by Pitney Bowes of Stamford, Conn. These inserters do not include sophisticated control panels because the features and functions provided with these inserters have not required more than a few basic switches for controlling, for example, start, stop and pause functions.

Inserter technology has progressed to the point that computer controlled features and functions normally provided with console inserters will be included in the next generation of the smaller inserters, such as table top inserters. The addition of such features and functions to the smaller inserters requires more control switches on the control panel to operate the machine. This also means that the operator must be trained to handle such additional features and functions, such as knowing which switches to push and when to push them.

As the new generation inserters become more sophisticated, the operation, setup and control becomes more complex. Although control software in the inserter provides the automated control and operation, proper operator interaction with the inserter software through the control panel is critical to the operation of the inserter. In addition, proper operator control is essential when the inserter operation is interrupted for various reasons, such as to correct problems which occur in the machine.

Some control switches may be used infrequently, such as set up switches, which may be used to set up the machine for a job that may run the entire day. Typically, an operator will resort to using an operation manual in performing set up of the inserter and other modes of operation requiring operator interaction.

Thus a problem has developed on how to make sophisticated small inserters more user friendly to the operator. Replacing the control switches with a touch screen control panel, such as found in the console inserters, is not a viable solution for the small inserters in a competitive market because it would be too costly.

SUMMARY OF THE INVENTION

It has been discovered that a cost effective method of making the control panel on a machine, such as an inserter more user friendly is for the control panel to act as a tutorial panel by identifying, for example by illumination, the control switches which are selectable by an operator, i.e. which will be recognized by the software controlling the inserter. It has been found that this method virtually eliminates the need for an operator to reference operating manuals during operation and set up of the inserter. It has also been found that this method significantly reduces operator training requirements on the inserter.

An apparatus in accordance with the present invention provides a simple, cost effective method which insures that the operator is always aware of the control options available at any given moment during the set up and operation of the inserter. It has been found that such an apparatus significantly improves operator performance and, therefore, the inserter performance, because it virtually eliminates the need for instant recall or manual referencing by the operator.

The present invention provides a method for controlling an apparatus. The method includes providing a control panel having a plurality of control switches and respectively associated illumination means, identifying by illumination of the associated illumination means which of the control switches are selectable for control at any given moment for the operation and set up of the apparatus, and choosing a particular operation by selecting one of the control switches whose associated illumination means are illuminated. The method further includes displaying messages on a display indicating status of the apparatus following operation of the control switches.

An apparatus embodying the present invention for controlling operation and set up of a machine includes controller means including control software for controlling the machine through a plurality of operating functions, a plurality of control switches mounted on the machine and operatively connected to the controller means, each of the switches being utilized for selecting one of the operating functions, means operatively connected to the controller means and associated with the control switches for indicating which of the operating functions can be selected by an operator, said selectable operating functions being indicated by illumination means for identifying each of the control switches representing the selectable operating functions at any given moment during the operation and set up of the machine.

BRIEF DESCRIPTION OF THE DRAWINGS

A complete understanding of the present invention may be obtained from the following detailed description of the preferred embodiment thereof, when taken in conjunction with the accompanying drawings wherein like reference numerals designate similar elements in the various figures and, in which.

DETAILED DESCRIPTION OF THE PREFERRED EMBODIMENT

The present invention relates to making control panels on sophisticated machines, such as inserter systems, more user friendly. It is known to control large console inserters, using touch screen control panels such as described in U.S. Pat. No. 4,547,856. It will be appreciated by those skilled in the art that the use of such touch screen control panels on smaller inserter systems is not practical because of cost and size. It is also known to use illumination of switches or indicators for indicating current status of a machine, such as an inserter. However, for a control panel with many switches, it has been found that status indication alone does not make the control panel user friendly.

Figure 1:
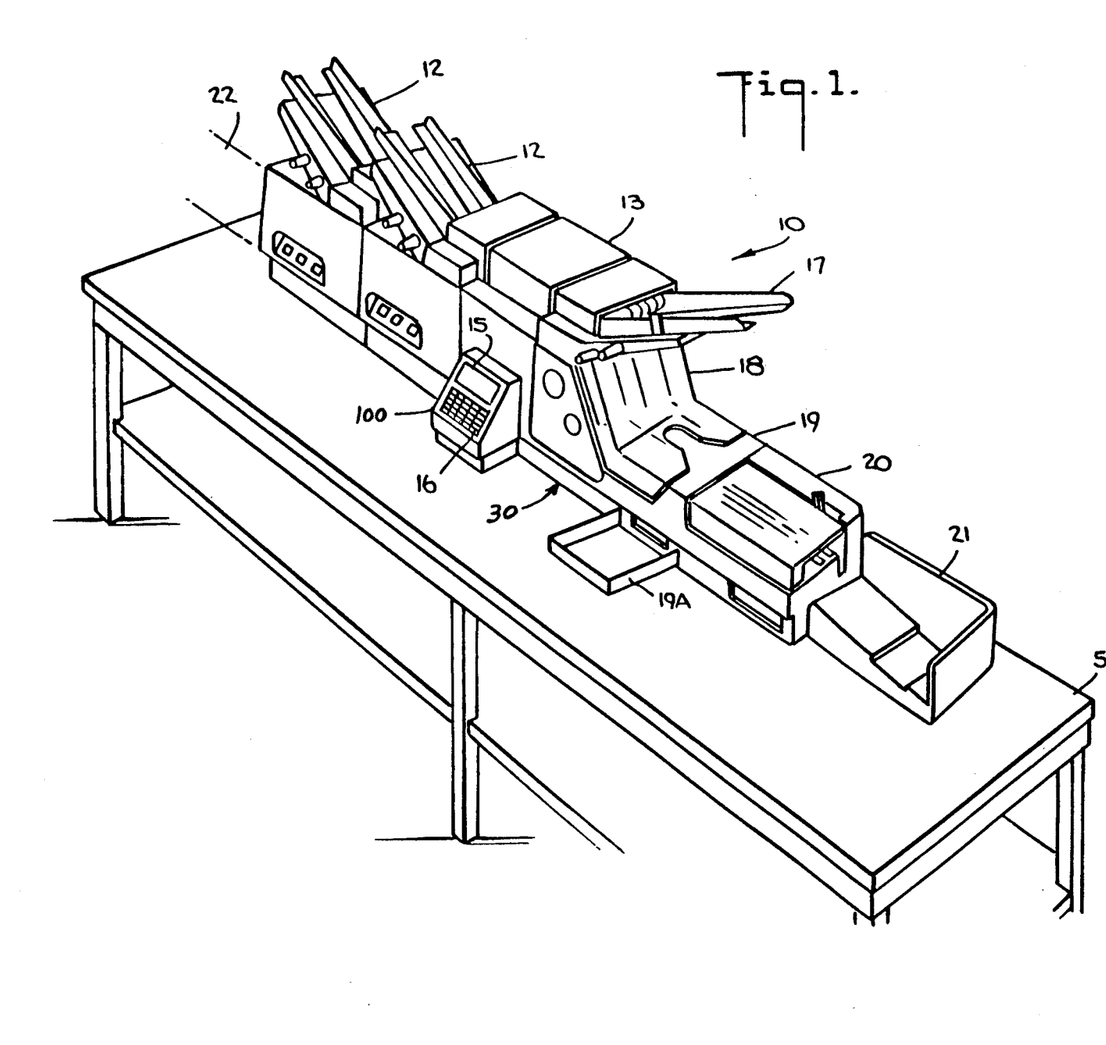
FIG. 1 is a perspective view of a table top inserter.

Referring now to FIG. 1, a table top inserter is shown. Generally, table top inserters do not require more than a few control switches, such as start, stop and pause, on a control panel because the features and control systems of such inserters are limited to a few basic functions. However, the new generation table top inserters presently under development will contain the types of features and functions normally found in console inserters. The control systems for such inserters will include sophisticated computer control. As a result, the operation of such inserters is becoming significantly more complex than the operation of the current table top inserters.

Figure 2:
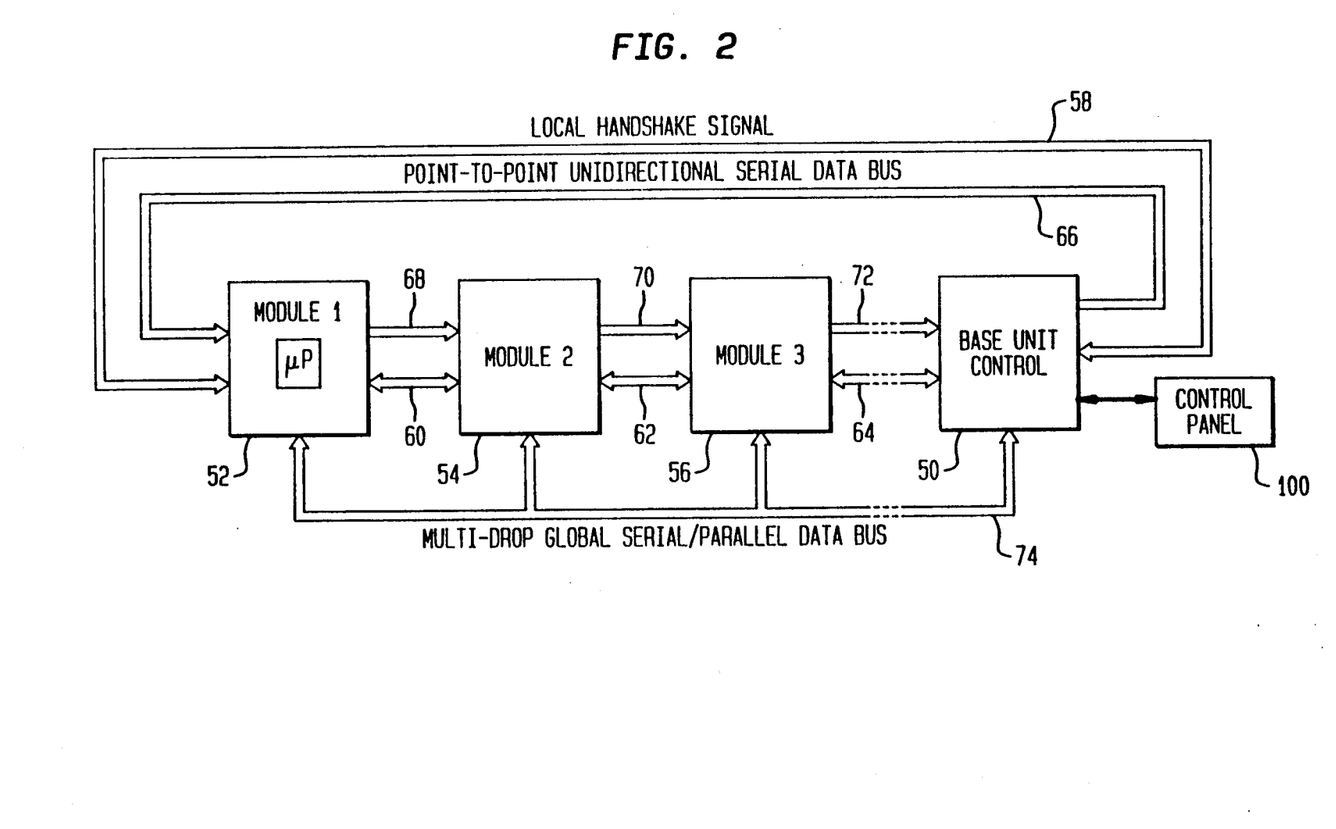
FIG. 2 is a block diagram of the control system and interface.

Referring now to FIG. 2, an example of the control system of an inserter embodying the present invention is shown. The control system includes a base unit controller 50 interfacing with controllers at modules 52, 54, and 56. The controllers 50, 52, 54 and 56 may be, for example, type 80C32 Intel controllers manufactured by Intel Corporation, of Santa Clara, Calif. The control system further includes control software in each of the controllers 50, 52, 54, 56 for controlling the inserter. Control panel 100 provides controller 50 with operator initiated control signals which when recognized by the control software controls the functions performed by the inserter. In the preferred embodiment of the present invention the control software in controller 50 sends signals to control panel 100 indicating functions selectable by the operator. An example of a control system for a new generation modular table top inserter is described in more detail in U.S. patent application Ser. No. 292,616 filed on Dec. 30, 1988, assigned to the assignee of the present invention and incorporated herein by reference.

Figure 3:
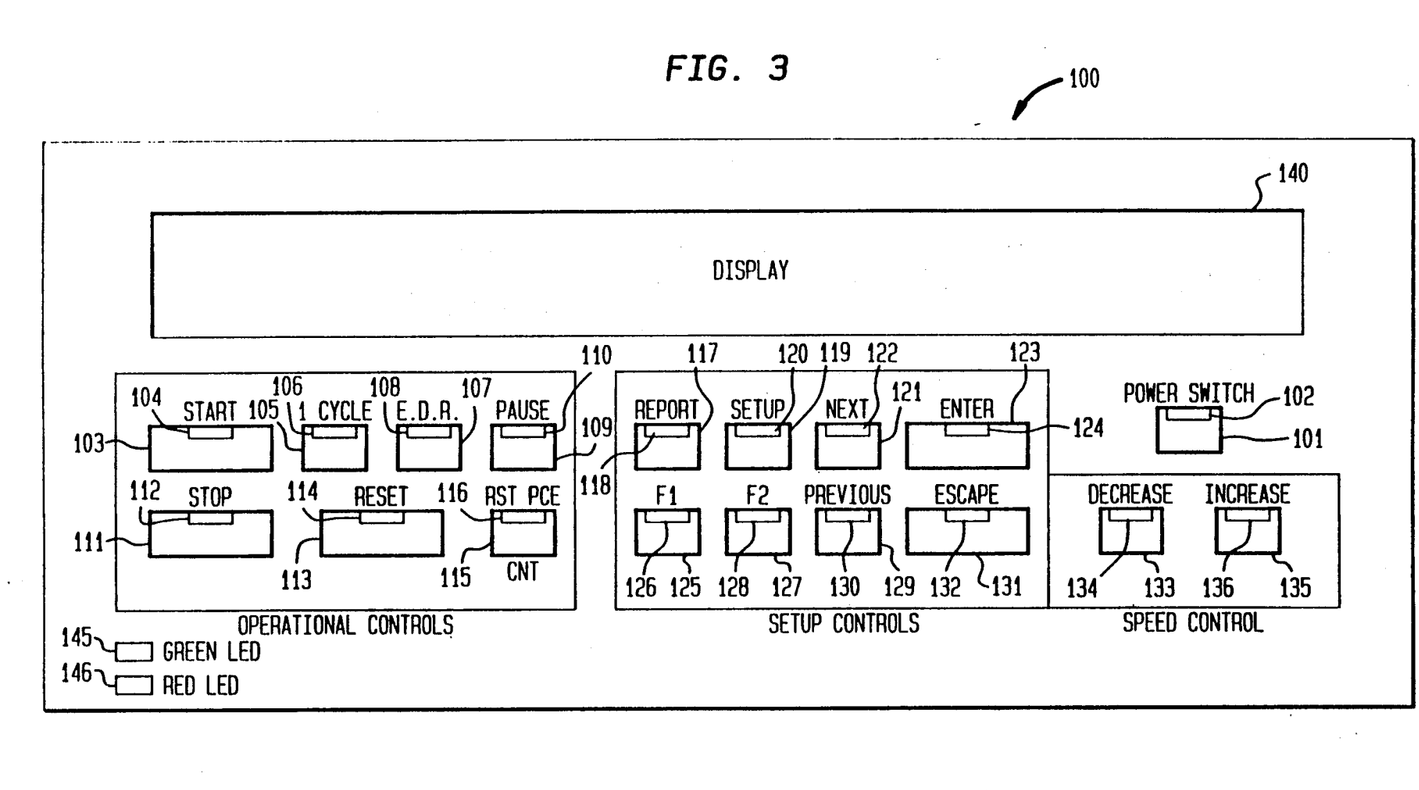
FIG. 3 is a layout of a control panel embodying the present invention.

Referring now to FIG. 3, a control panel 100 embodying the present invention is shown. In the preferred embodiment of the present invention control panel 100 consists of a plurality of control switches odd numbered 101–135 and associated light emitting diodes (LED's) even numbered 102–136, a display 140 and two status LED's 145, 146. In the preferred embodiment, the control panel 100 is located on the base module of the inserter system shown at 30 in FIG. 1. The status LED's 145 and 146 are located on each module for indicating when an error has been detected in the module. The green LED 145 indicates no error has been detected and the red LED 146 indicates an error has been detected in the module.

In the preferred embodiment of the present invention, each of the control switches odd numbered 101–135 contains respectively an LED even numbered 102–136 for communicating operational information to the operator. An illuminated LED on a particular switch indicates to the operator that selection of that switch by the operator will be recognized by the control system of the inserter. It has been found that the present invention provides a user friendly tutorial control panel which renders the operator actions more reliable and timely than a typical control panel. The following description of the preferred embodiment of the present invention is by way of example.

Figure 4A:
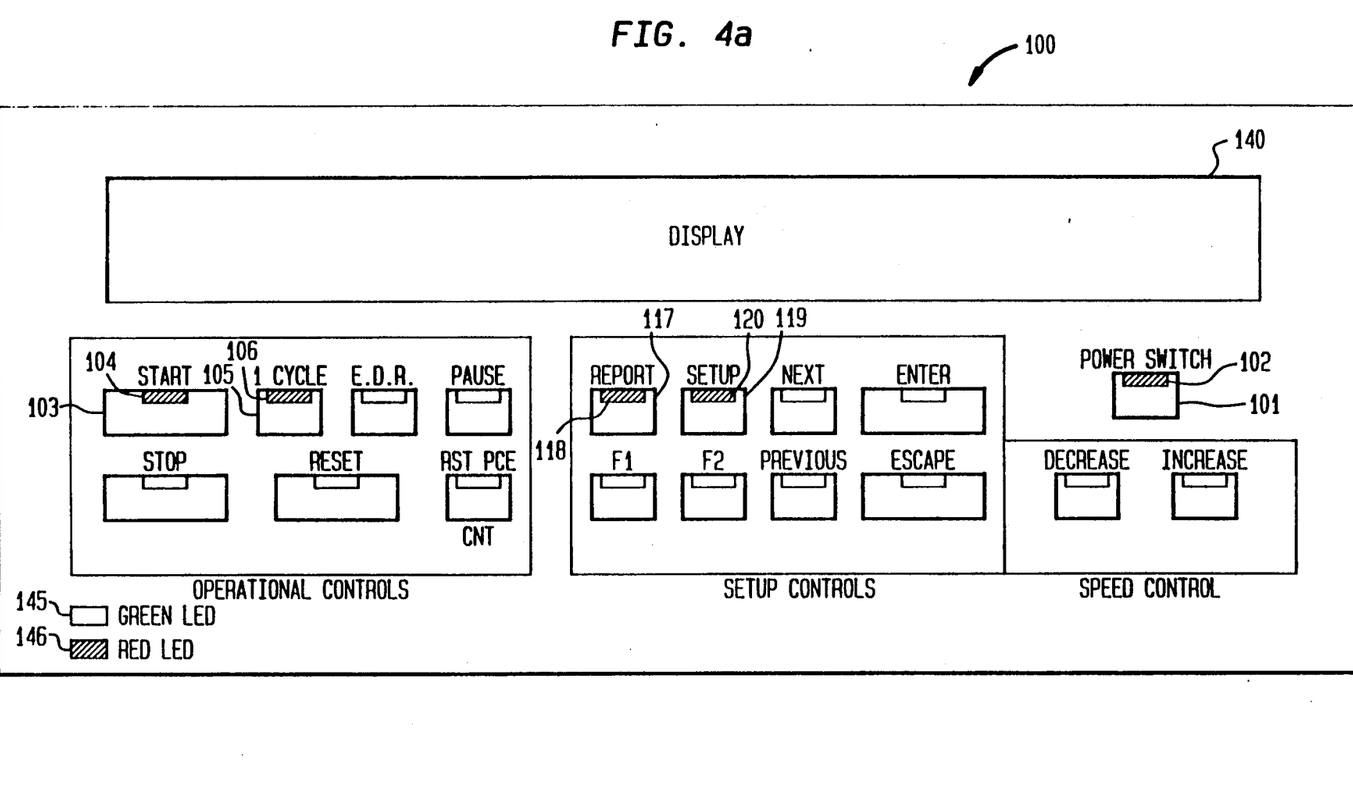
FIG. 4a is a layout of the control panel in FIG. 2 when the inserter is turned on, but not in run mode.
Figure 4B:
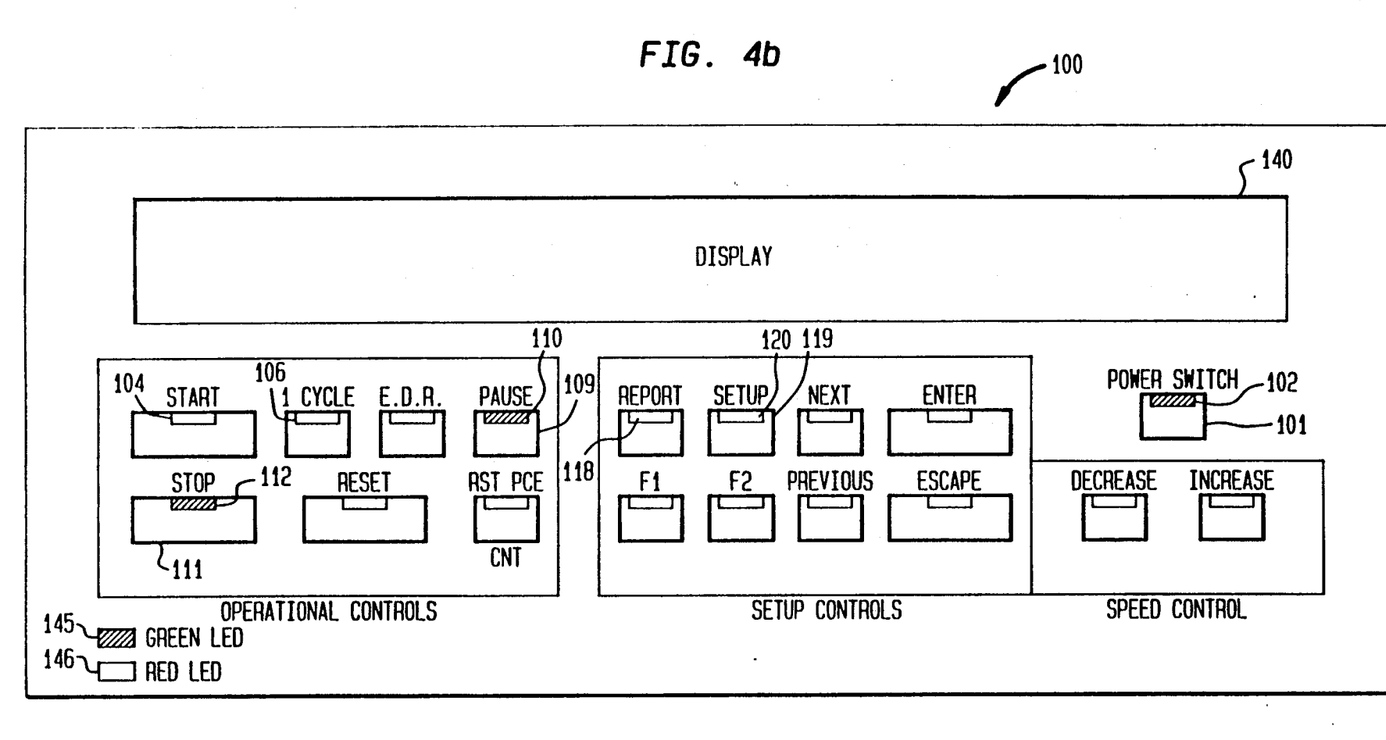
FIG. 4b is a layout of the control panel in FIG. 2 when the inserter is in run mode.

Referring now to FIG. 4a, when the machine is first turned on via power switch 101 LED's 104, 106, 118 and 120 are illuminated indicating respectively that the only selectable functions are START, ONE-CYCLE, REPORT and SET-UP. Green LED 145 is also illuminated to indicate no errors have been detected in the module containing the control panel. When viewing the control panel 100, the operator now knows that only START switch 103, ONE-CYCLE switch 105, REPORT switch 117 and SET-UP switch 119 will be recognized by the control system when operated. If the operator now selects START by operating switch 103, the system enters run mode and the selectable functions change to STOP and PAUSE, which are now indicated to the operator because, as shown in FIG. 4b, LED's START 104, ONE-CYCLE 106, REPORT 118 and SET-UP 120 are turned off and the PAUSE LED 110 and the STOP LED 112 are illuminated.

Figure 4C:
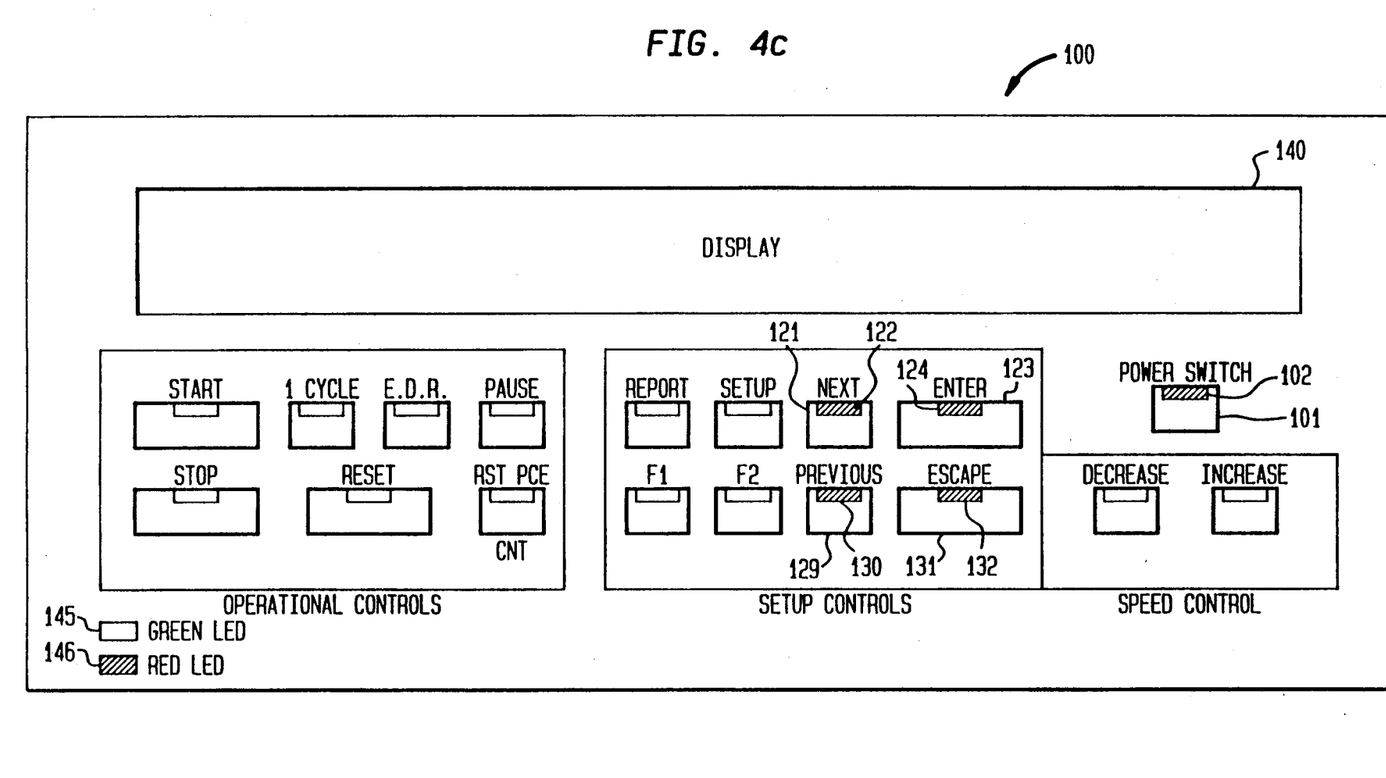
FIG. 4c is a layout of the control panel in FIG. 2 when the inserter is in set-up mode.

In FIG. 4a, it was noted that illuminated SET-UP LED 120 indicates that the operator can select the SET-UP function by operating SET-UP switch 119. When SET-UP is selected, as shown in FIG. 4c, LED's 104, 106, 118 and 120 are turned off and LED's NEXT 122, ENTER 124, PREVIOUS 130 and ESCAPE 132 are illuminated indicating respectively that the selectable functions have change to NEXT, ENTER, PREVIOUS and ESCAPE. The operator now knows that only NEXT switch 121, ENTER switch 123, PREVIOUS Switch 129 and ESCAPE switch 131 are selectable.

Figure 4D:
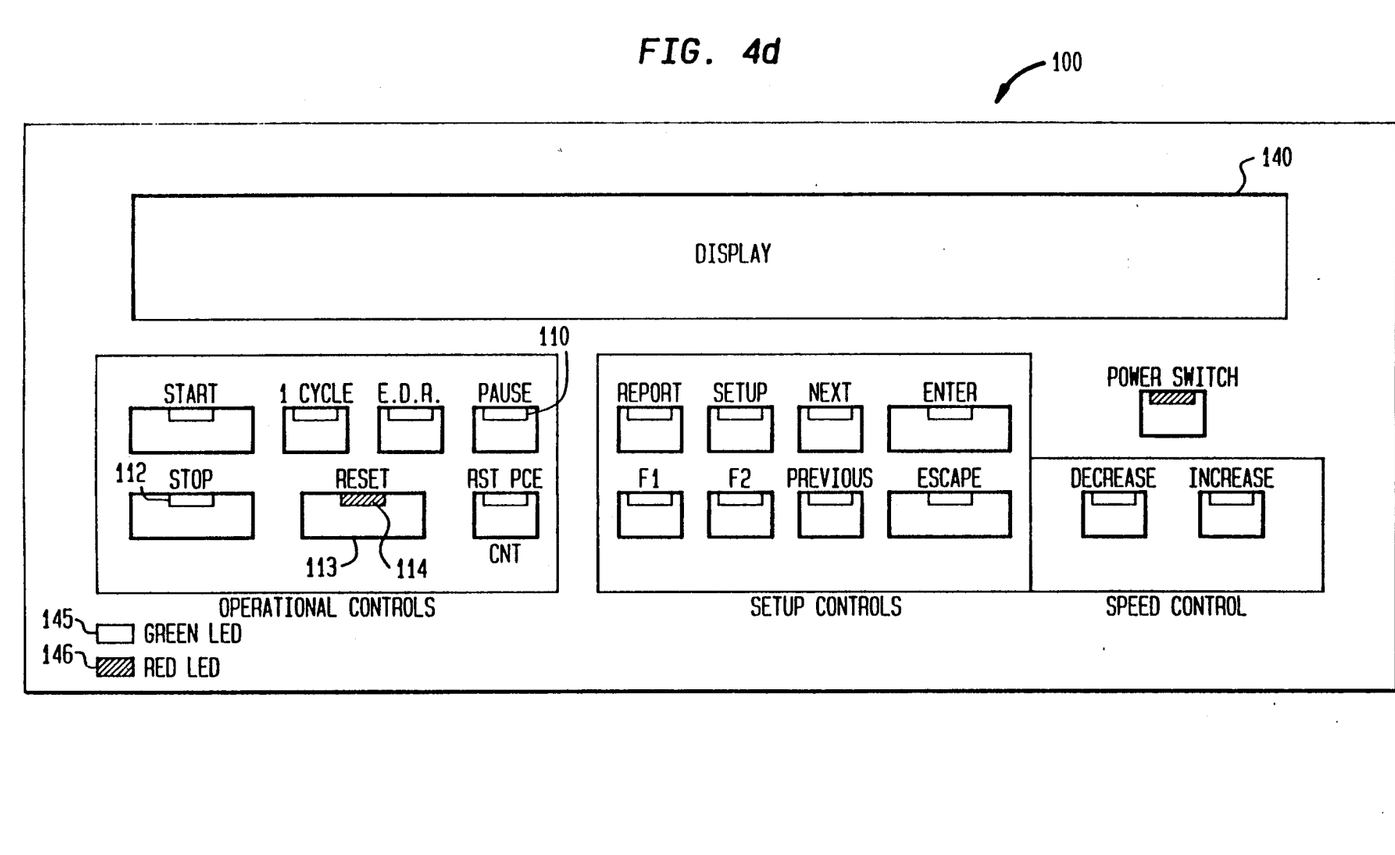
FIG. 4d is a layout of the control panel in FIG. 2 when an error condition has halted the inserter.

Referring again to FIG. 4b, when the inserter is in run mode an error may be detected causing the inserter to stop. When the inserter stops because of an error the only valid function is RESET. As shown in FIG. 4d, the PAUSE and STOP LED's 110 and 112 are turned off and the RESET LED 114 is illuminated indicating to the operator that RESET switch 113 must be operated before the run mode can be resumed. If the error condition is in the base module, red LED 146 will be illuminated and green LED 145 will be turned off indicating the base module error. If the error is in another module the red LED for that module will be illuminated and the green LED for that module will be turned off. An error message pertaining to the error detected in any module is displayed on Display 140. The error message directs the operator to the error condition requiring attention before the RESET switch 113 can be operated. Once the error condition is corrected, the operator operates RESET switch 113, run mode is resumed and the control panel returns to the status shown in FIG. 4a.

It will be appreciated by those skilled in the art that the tutorial control panel facilitates the operator's actions with regard to set-up and operation of the inserter. The description in the preceding paragraphs are provided as an example of the preferred embodiment of the present invention. It will be understood that the selectable functions change each time one of the control switches is operated. The scope of the present invention is the concept of a tutorial control panel but is not limited to inserters or to any particular control system or control panel.

Figure 5:
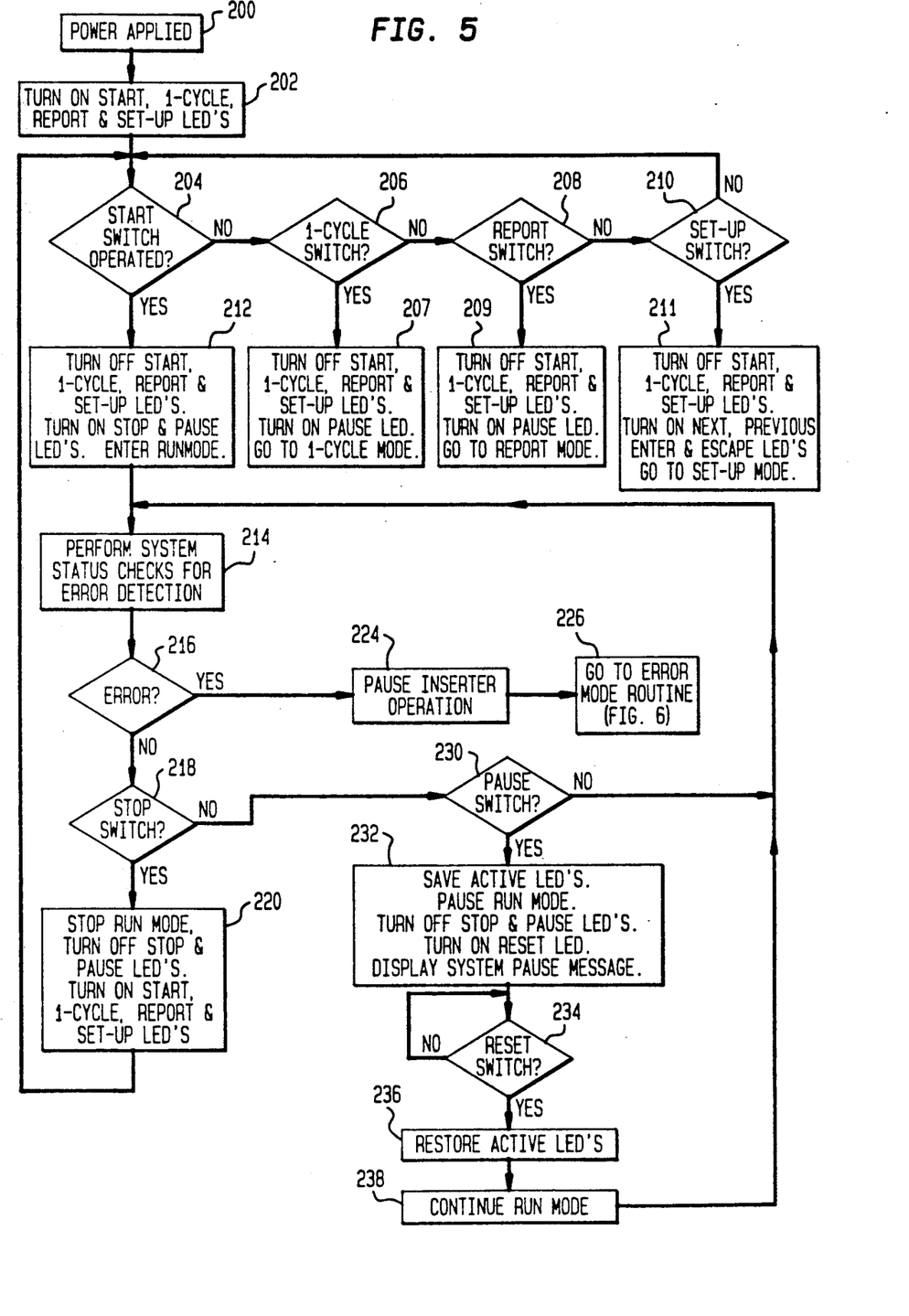
FIG. 5 is a flow chart showing the present invention during start/run mode of the inserter.
Figure 6:
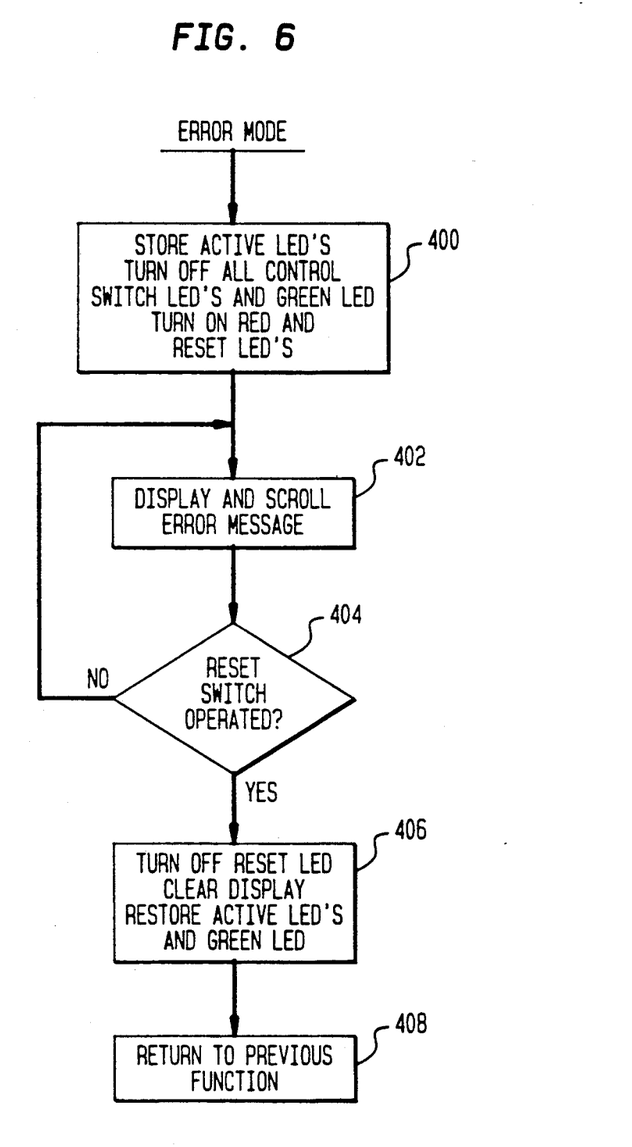
FIG. 6 is a flow chart showing the present invention when an error condition occurs.

Referring now to FIGS. 5 and 6, an example of the software control associated with the preferred embodiment of the present invention, as described for FIGS. 4a–4d, is shown by way of flow charts.

The start/run mode of the inserter is shown in FIG. 5. In block 200, power is applied to the inserter when switch 101 is operated. In block 202, LED's POWER 102, START 104, 1-CYCLE 106, REPORT 118, SET-UP 120 and GREEN 146 are turned on. A check for operation of START switch 103 is made in block 204. If not operated, a check for operation of the remaining selectable switches 1-CYCLE 105, REPORT 117 and SET-UP 119 is made in blocks 206, 208, and 210 respectively. If 1-CYCLE switch 105 is operated, in block 207 the system enters 1-CYCLE mode, LED's START 104, 1-CYCLE 106, REPORT 118 and SET-UP 120 are turned off and PAUSE LED 110 is turned on. If REPORT switch 117 is operated, in block 209 the system enters report mode, LED's START 104, 1-CYCLE 106, REPORT 118 and SET-UP 120 are turned off and PAUSE LED 110 is turned on. If SET-UP switch 120 is operated, the system enters set-up mode, LED's START 104, 1-CYCLE 106, REPORT 118 and SET-UP 120 are turned off and LED's NEXT 122, ENTER 124, PREVIOUS 130 and ESCAPE 132 are turned on.

If START switch 103 is operated, in block 212 LED's START 104, 1-CYCLE 106, REPORT 118 and SET-UP 120 are turned off, LED's PAUSE 110 and STOP 112 are turned on and the system enters run mode. In block 214, the system performs system status checks to detect predetermined error conditions. In block 216, if an error condition is detected, the inserter operation is paused in block 224. In block 226 the system goes to the error mode routine which is described below. If no error is detected, the operation of STOP switch 111 is checked in block 218. If the STOP switch 111 is not operated then the operation of PAUSE switch 109 is checked in block 230. The system returns to system status checks in block 214 if neither switch is operated.

If STOP switch 111 is operated, in block 220 the inserter operation is stopped, LED's PAUSE 110 and STOP 112 are turned off and LED's START 104, 1-CYCLE 106, REPORT 118 and SET-UP 120 are turned on. If PAUSE switch 109 is operated, in block 232 all active LED's are saved, (i.e. LED's PAUSE 110 and STOP 112), inserter operation is paused, LED's PAUSE 110 and STOP 112 are turned off, RESET LED 114 is turned on and a system paused message is displayed on display 140. In block 234, the operation of the RESET switch 113 is checked until operation is detected at which time RESET LED 114 is turned off and the LED's saved in block 232 are restored. The system then resumes run mode in block 238 and return's to system status checks in block 214.

In FIG. 6, the error mode routine is shown. When an error is detected in the system for example, in block 216 in FIG. 5, the system enters the error mode routine. In block 400, all active LED's are saved, all control switch LED's are turned off and RESET LED 114 is turned on. Red LED 146 is also turned on and green LED 145 is turned off if the error is detected in the base module. In block 402, an error message describing the type of error detected is displayed on and scrolled across display 140. The system then waits for operation of RESET switch 113 in block 404. When RESET switch 114 is operated (after the error condition has been corrected), in block 406 LED's RESET 114 and red 146 (if illuminated) are turned off, the display is cleared and the active LED's saved in block 400 are restored. In block 408 the system returns to the previous function which was operating when the error was detected, for example to block 214 in FIG. 5.

While the invention has been disclosed and described with reference to a single embodiment, it will be apparent that variations and modifications may be made therein. In particular, it will be apparent that the present invention is suitable for use on any machine having a control panel which can be made more user friendly through the tutorial control panel approach described herein. It is therefore intended in the following claims to cover each such variation and modification as falls within the true spirit and scope of the invention.

I claim:

1. In an inserter, an apparatus for controlling the operation and setup of the inserter, comprising:
   computer means for controlling said inserter, said computer means including control software for controlling said inserter through a plurality of operating functions,
   control switches mounted on the inserter and operatively connected to said computer means, each of said control switches representing at least one of said operating functions,
   indicator means associated with each of said control switches for indicating which of said control switches when operated will be recognized by said computer means during the operation and set up of the inserter.

2. Apparatus in accordance with claim 1 wherein said indicator means includes a light emitting diode (LED) associated with each of said control switches.

3. Apparatus in accordance with claim 2, wherein each of said LED's illuminated indicate which of said associated control switches will be recognized by said computer means and each of said LED's not illuminated indicate which of said associated control switches will not be recognized.

4. Apparatus in accordance with claim 3 wherein said computer means includes a microcontroller.

5. A method of assisting an operator in controlling an apparatus having a plurality of control switches, comprising the steps of:
   a) providing separate visual indicating means for each of the plurality of control switches;
   b) distinguishing between selectable and nonselectable ones of the control switches at each given instant by illuminating the visual indicating means for all selectable ones of the control switches, and extinguishing the visual indicating means for all nonselectable control switches at said given instant;

c) updating said visual indicating means as needed while the apparatus is operating to distinguish between the selectable and nonselectable ones of the control switches when a condition in the apparatus requires said update.

6. The method according to claim 5, comprising the further steps of:

e) updating said visual indicating means when an error is detected while the apparatus is operating; and f) updating said visual indicating means during startup and shutdown of the apparatus.

7. In a machine including means for controlling operation and set up of the machine, and a plurality of control switches operatively connected to the controlling means, each of the switches being dedicated for selecting one of a plurality of operating functions, an improvement comprising:

means operatively connected to the controlling means and associated with the control switches for indicating which of the control switches are selectable by an operator at each instant, wherein the controlling means activates a corresponding operating function of a selected one of said selectable switches, said means for indicating including individual illumination means associated with each of the control switches.

8. Apparatus in accordance with claim 7 wherein said illumination means include a light emitting diode (LED) associated with each of said control switches.

9. Apparatus in accordance with claim 8 wherein each of said LED's is illuminated when the associated control switch is selectable by an operator and not illuminated when the associated control switch is not selectable.

* * * * *